Sept. 10, 1957     H. B. BARRETT     2,805,486
BRAKE SHOE GAUGES
Filed Sept. 14, 1955
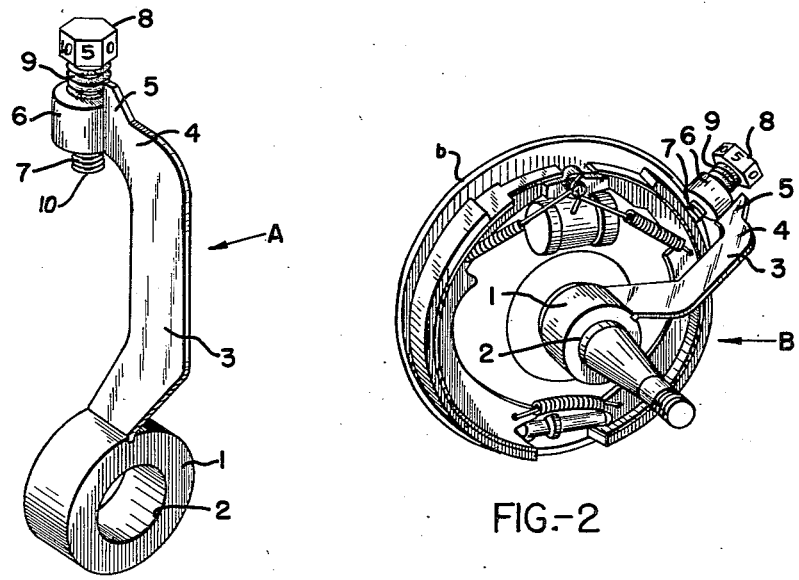
FIG.-1
FIG.-2
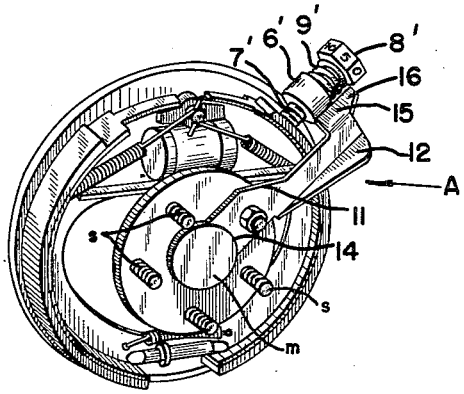
FIG.-4
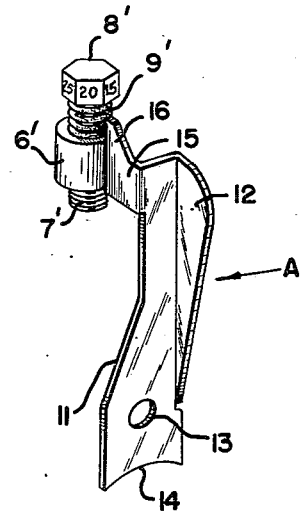
FIG.-3
INVENTOR.
HARRY B. BARRETT
BY *Alfred W. Fetchaft*
ATTORNEY

United States Patent Office 2,805,486
Patented Sept. 10, 1957

2,805,486

BRAKE SHOE GAUGES

Harry B. Barrett, Clayton, Mo.

Application September 14, 1955, Serial No. 534,246

1 Claim. (Cl. 33—180)

This invention relates in general to certain new and useful improvements in automotive brake repair and maintenance tools and, more particularly, to a brake shoe gauge for determining the radial size and concentricity of the braking surfaces of automotive brake shoes.

It is the primary object of the present invention to provide a brake shoe gauge for use in determining the size and arcuate contour of the braking surfaces of automotive brake shoes.

It is another object of the present invention to provide a gauge of the type stated which is unusually simple and accurate in construction and can be readily employed to determine the amount of irregularity at different portions of the braking surface of the brake shoe.

It is also an object of the present invention to provide a gauge of the type stated which can be easily read or interpreted.

With the above and other objects in view, my invention resides in the novel features of form, construction, arrangement, and combination of parts presently described and pointed out in the claim.

In the accompanying drawings (one sheet)—

Figure 1 is a perspective view of a concentricity gauge constructed in accordance with and embodying the present invention;

Figure 2 is a perspective view of an automotive brake assembly with the concentricity gauge in operative position thereon;

Figure 3 is a perspective view of a modified form of concentricity gauge constructed in accordance with and embodying the present invention; and Figure 4 is a perspective view of an automotive brake shoe assembly with the modified form of concentricity gauge in operative position thereon.

Referring now in more detail and by reference characters to the drawings, A designates a brake shoe gauge comprising a spindle-engaging collar 1 having an accurately bored central aperture 2 sized for snug-fitting engagement upon the cylindrical portion of an automobile axle spindle as it protrudes through the backing plate *b* of a conventional automotive brake assembly B. Rigidly monunted in the outer portion of the collar 1 and extending radially outwardly therefrom is an arm 3 formed of heavy bar stock and being integrally provided at its outer ends with an inwardly curved top portion 4 having an upwardly extending finger-like index element 5. Welded or otherwise rigidly secured to the top portion 4 in radially downwardly spaced relation to the index element 5 is a tubular sleeve 6, the longitudinal axis of which is precisely radial with respect to the center of the collar 1. The sleeve 6 is concentrically bored and tapped for operatively receiving a threaded stud 7, the upper end of which is provided with a hexagonal head 8. Disposed encirclingly around the stud 7 and abuttingly interposed between the top face of the sleeve 6 and the under face of the stud head 8, is a compression spring 9 which is sufficiently strong to prevent the stud 7 from turning loosely and unauthorizedly within the sleeve 6. The side faces of the stud head 8 are provided with numerical graduations, such as those visible on three sides thereof in Fig. 1. The graduations are related to the pitch of the thread on the stud 7 in such a manner that one-sixth of a turn of the stud 7 will cause the stud to translate lengthwise within the sleeve 6 by a distance equal to .050". When the stud head face, which bears the "0," is aligned directly above the index element 5, the end face 10 of the stud 7 will be located at a precise and predetermined distance radially outwardly through the centerline or axis of the collar 1. By rotating the stud 7 until the face bearing the numeral "5" is aligned with the index element 5, the stud 7 will be shifted outwardly so that the end face 10 will be .050" oversized. Similarly, by rotating the stud 7 until the face bearing the numeral "10" is aligned with the index element 5, the stud face 10 will be shifted outwardly to a position in which the gauge is .100" oversize. The spring 9 will serve to hold the stud 7 in any one of its several positions and yet will not interfere with intentional rotation or adjustment of the stud 7.

The gauge A is slipped over the automotive axle spindle in the manner substantially as shown in Figure 2 and the stud 7 rotated to zero position. In this position, the end face 10 of the stud 7 should just barely contact the surface of the brake shoe as the gauge A is swung in a full circle to-and-fro around the entire periphery of the brake B. Actually, there may be high spots on one or both the brake shoes, in which case the stud will not swing around freely, but will bump against these high spots indicating their presence. The mechanic can then twist the stud 7 to determine the radial height of the high spot and can grind off, sand paper, or otherwise smooth down the high spot until it is truly concentric in common with all other areas of the brake shoe surface.

It should be noted that the brake shoe gauge A is designed for use with brakes which are mounted on wheels having spindles, such as is the case in the front wheel brake assembly of current models of the Chevrolet automobile.

In current Chevrolet models, however, the back wheels are not provided with axle spindles, but are carried by a wheel plate having five threaded studs and this is true of some other makes of automobiles as well. For use with such wheels, it is possible to provide a modified form of brake shoe gauge A', as shown in Figure 3, comprising a flat metal stamping 11 having an upstanding stiffening flange 12 disposed in a plane perpendicular to the plane of the stamping 11. At its lower end, the stamping 11 is somewhat enlarged and provided with an aperture 13 adapted to fit more or less snugly around one of the wheel mounting studs *s* and the lower margin of the stamping is curved as at 14 to fit snugly against the hub-like mounting boss *m* of the wheel and brake assembly, substantially as shown in Figure 4. At its outer end, the stamping 11 is integrally provided with an inwardly turned arm 15, which integrally includes an upstanding index element 16. Welded or otherwise rigidly secured to the arm 15 directly below the index element 16 is a sleeve 6' threadedly provided with a stud 7', having a stud head 8' and being provided with a spring 9', all of which are respectively similar to the previously described sleeve 6, stud 7, stud head 8, and spring 9. The modified form of concentricity gauge A' is mounted on the wheel substantially as shown in Figure 4 and is used in the same manner as previously described in connection with the concentricity gauge A.

It should be understood that changes and modifications in the form, construction, arrangement, and combination of the several parts of the brake shoe gauge may be made and substituted for those herein shown and described without departing from the nature and principle of my invention.

Having thus described my invention, what I claim and desire to secure by Letters Patent is:

A brake shoe gauge for use with a wheel-axle assembly or an automobile in which the wheel-axle assembly is equipped with arcuate brake shoes; said brake shoe gauge comprising a central support means adapted for snug-fitting removable disposition concentrically upon the wheel-axle assembly of an automobile, a rigid radial arm fixed upon and carried by said support means, a top portion carried by the arm and located at the outer end thereof, a sleeve mounted on the end of the top portion, said sleeve having an internally threaded bore positioned so that its axis is radial in relation to the axle and spaced inwardly in relation to the arm, a relatively thin index means projecting radially outwardly beyond said sleeve and being located in laterally spaced relation to the threaded bore thereof, a brake shoe contacting element threadedly mounted in said bore and carried by the sleeve for affording a measurement of the radial distance between the axis of rotation of the wheel-axle assembly and the outer arcuate surface of a brake shoe, said brake shoe contacting element having a head located in visual proximity to the index means and being provided with a plurality of graduations adapted for optional alignment with said indexing means, and spring means interposed between said sleeve and said head to prevent said brake shoe contacting element from turning loosely within said sleeve.

References Cited in the file of this patent

UNITED STATES PATENTS 2,553,525     Burke et al. _____ May 15, 1951

FOREIGN PATENTS 489,020     Canada _____ Dec. 23, 1952